US008862980B2

(12) United States Patent   (10) Patent No.: US 8,862,980 B2
MacGregor   (45) Date of Patent: Oct. 14, 2014

(54) GUIDED GRAPHICAL NAVIGATION THROUGH MULTIDIMENSIONAL DATABASES

(75) Inventor: John Malcolm MacGregor, Ascot (GB)

(73) Assignee: Business Objects Software Limited, Dublin (IE)

( * ) Notice: Subject to any disclaimer, the term of this patent is extended or adjusted under 35 U.S.C. 154(b) by 1980 days.

(21) Appl. No.: 11/771,239

(22) Filed: Jun. 29, 2007

(65) Prior Publication Data

US 2009/0002373 A1   Jan. 1, 2009

(51) Int. Cl.
*G06F 17/00* (2006.01)
*G06F 17/30* (2006.01)
*G06F 17/24* (2006.01)

(52) U.S. Cl.
CPC ........ *G06F 17/246* (2013.01); *G06F 17/30592* (2013.01); *G06F 17/30554* (2013.01); *G06F 17/30572* (2013.01)
USPC ......... 715/215; 715/700; 715/765; 345/440.2

(58) Field of Classification Search
CPC .................... G06F 17/30572; G06F 17/30592; G06F 17/30554; G06F 17/246; G06T 11/20
USPC ........................ 715/215, 700, 765; 345/440.2
See application file for complete search history.

(56) References Cited

U.S. PATENT DOCUMENTS

| | | | | |
|---|---|---|---|---|
| 5,581,677 | A * | 12/1996 | Myers et al. | 345/440 |
| 6,330,283 | B1 * | 12/2001 | Lafe | 375/240.18 |
| 6,704,016 | B1 * | 3/2004 | Oliver et al. | 345/440.2 |
| 6,750,864 | B1 * | 6/2004 | Anwar | 345/440 |
| 7,071,940 | B2 * | 7/2006 | Malik | 345/440 |
| 7,082,568 | B2 * | 7/2006 | Iwamoto et al. | 715/212 |
| 7,239,316 | B1 * | 7/2007 | Cox et al. | 345/440 |
| 7,530,012 | B2 * | 5/2009 | Medicke et al. | 715/212 |
| 7,643,029 | B2 * | 1/2010 | Hao et al. | 345/440 |
| 7,693,822 | B2 * | 4/2010 | Brunner et al. | 707/999.002 |
| 7,779,344 | B1 * | 8/2010 | Hao et al. | 715/215 |
| 8,244,689 | B2 * | 8/2012 | Betz et al. | 707/692 |
| 2004/0237029 | A1 * | 11/2004 | Medicke et al. | 715/503 |
| 2006/0031187 | A1 * | 2/2006 | Pyrce et al. | 707/1 |
| 2008/0071580 | A1 * | 3/2008 | Marcus et al. | 705/3 |
| 2008/0148168 | A1 * | 6/2008 | Koran et al. | 715/771 |
| 2009/0105984 | A1 * | 4/2009 | Wen et al. | 702/127 |

OTHER PUBLICATIONS

Papadokonstantakis et al , "Variable selection and data pre-processing in NN modelling of complex chemical processes", Apr. 15, 2005, p. 1647-1659.*
Benish, "Relative Entropy as a Measure of Diagnostic Information", 1999, p. 202-206.*
Simon, "Excel 2000 in a Nutshell", Aug. 24 2000, p. 1-89 + 1 cover sheet (90 pages total).*
Microsoft, Microsoft Excel 2003, copyrighted 2003, SSO-11c, 18 pages.*
Rosenberg, Roni; "A Gentle Tutorial on Information Theory and Learning", 1999, Carnegie Mellon University, 6 pages https://www.cs.cmu.edu/~roni/10601-slides/info-theory-x4.pdf.*

* cited by examiner

*Primary Examiner* — Cesar Paula
*Assistant Examiner* — David Faber
(74) *Attorney, Agent, or Firm* — Mintz Levin Cohn Ferris Glovsky and Popeo, P.C.

(57) ABSTRACT

A computer readable storage medium includes executable instructions to analyze a categorical dimension of multi-dimensional data as a function of entropy to form entropy results. The entropy results are plotted as a stacked bar chart. A user graphically navigates through the stacked bar chart.

20 Claims, 17 Drawing Sheets

| Category | A | B | C | D | E | Total | Entropy |
|---|---|---|---|---|---|---|---|
| One outcome | 50.0 | 0.0 | 0.0 | 0.0 | 0.0 | 50 | 0.0000 |
| Two equal outcomes | 25.0 | 25.0 | 0.0 | 0.0 | 0.0 | 50 | 1.0000 |
| Two unequal outcomes | 30.0 | 20.0 | 0.0 | 0.0 | 0.0 | 50 | 0.9710 |
| Three equal outcomes | 16.7 | 16.7 | 16.7 | 0.0 | 0.0 | 50 | 1.5850 |
| Four equal outcomes | 12.5 | 12.5 | 12.5 | 12.5 | 0.0 | 50 | 2.0000 |
| Five equal outcomes | 10.0 | 10.0 | 10.0 | 10.0 | 10.0 | 50 | 2.3219 |

FIG. 3

| A | B | C | Time | M1 | M2 |
|---|---|---|---|---|---|
| A1 | B1 | C1 | H1 | x1 | y1 |
| A1 | B1 | C1 | H2 | x2 | y2 |
| A1 | B1 | C1 | Total | x3 | y3 |
| A1 | B1 | C2 | H1 | x4 | y4 |
| A1 | B1 | C2 | H2 | x5 | y5 |
| A1 | B1 | C2 | Total | x6 | y6 |
| A1 | B2 | C1 | H1 | x7 | y7 |
| A1 | B2 | C1 | H2 | x8 | y8 |
| A1 | B2 | C1 | Total | x9 | y9 |
| A1 | B2 | C2 | H1 | x10 | y10 |
| A1 | B2 | C2 | H2 | x11 | y11 |
| A1 | B2 | C2 | Total | x12 | y12 |
| A1 | B3 | C1 | H1 | x13 | y13 |
| A1 | B3 | C1 | H2 | x14 | y14 |
| A1 | B3 | C1 | Total | x15 | y15 |
| A1 | B3 | C2 | H1 | x16 | y16 |
| A1 | B3 | C2 | H2 | x17 | y17 |
| A1 | B3 | C2 | Total | x18 | y18 |
| A2 | B1 | C1 | H1 | x19 | y19 |
| A2 | B1 | C1 | H2 | x20 | y20 |
| A2 | B1 | C1 | Total | x21 | y21 |
| A2 | B1 | C2 | H1 | x22 | y22 |
| A2 | B1 | C2 | H2 | x23 | y23 |
| A2 | B1 | C2 | Total | x24 | y24 |
| A2 | B2 | C1 | H1 | x25 | y25 |
| A2 | B2 | C1 | H2 | x26 | y26 |
| A2 | B2 | C1 | Total | x27 | y27 |
| A2 | B2 | C2 | H1 | x28 | y28 |
| A2 | B2 | C2 | H2 | x29 | y29 |
| A2 | B2 | C2 | Total | x30 | y30 |
| A2 | B3 | C1 | H1 | x31 | y31 |
| A2 | B3 | C1 | H2 | x32 | y32 |
| A2 | B3 | C1 | Total | x33 | y33 |
| A2 | B3 | C2 | H1 | x34 | y34 |
| A2 | B3 | C2 | H2 | x35 | y35 |
| A2 | B3 | C2 | Total | x36 | y36 |

FIG. 4

| Product | | | | | |
|---|---|---|---|---|---|
| Category Number | Product | Count | Probability | Surprisal | Entropy |
| 1 | Accessories | 1 | 0.0002 | 12.3581 | 0.0024 |
| 2 | Armagnac | 15 | 0.0029 | 8.4512 | 0.0241 |
| 3 | Beer | 568 | 0.1088 | 3.2008 | 0.3481 |
| 4 | Brandy | 40 | 0.0076 | 7.0362 | 0.0536 |
| 5 | CACHACA | 1 | 0.0002 | 12.3581 | 0.0024 |
| 6 | Cider | 47 | 0.0090 | 6.8095 | 0.0609 |
| 7 | Cognac | 20 | 0.0038 | 8.0362 | 0.0306 |
| 8 | Coolers | 102 | 0.0194 | 5.6857 | 0.1105 |
| 9 | Eaux De Vie | 16 | 0.0030 | 8.3581 | 0.0255 |
| 10 | Fortified Wine | 203 | 0.0387 | 4.6928 | 0.1815 |
| 11 | Gift Packs | 52 | 0.0099 | 6.6577 | 0.0659 |
| 12 | Gin | 38 | 0.0072 | 7.1102 | 0.0515 |
| 13 | Ice Wine | 38 | 0.0072 | 7.1102 | 0.0515 |
| 14 | Liqueurs | 233 | 0.0444 | 4.4939 | 0.1994 |
| 15 | Other Spirits | 29 | 0.0055 | 7.5001 | 0.0414 |
| 16 | Rum | 118 | 0.0225 | 5.4755 | 0.1231 |
| 17 | Sparkling Wine | 154 | 0.0293 | 5.0913 | 0.1493 |
| 18 | Table Wine | 3,136 | 0.5973 | 0.7434 | 0.4441 |
| 19 | Tequila | 36 | 0.0069 | 7.1882 | 0.0493 |
| 20 | Vodka | 119 | 0.0227 | 5.4633 | 0.1238 |
| 21 | Whisky | 281 | 0.0535 | 4.2237 | 0.2261 |
| | Total | 5,250 | 1 | 138.0979 | 2.3649 |
| Maximum Entropy | 4.3923 | | | | |
| Entropy Percent | 53.84 | | | | |

FIG. 5

| Country | | | | | |
|---|---|---|---|---|---|
| Category Number | Country | Count | Probability | Surprisal | Entropy |
| 1 | Argentina | 65 | 0.0124 | 6.3357 | 0.0784 |
| 2 | Armenia | 2 | 0.0004 | 11.3581 | 0.0043 |
| 3 | Australia | 492 | 0.0937 | 3.4156 | 0.3201 |
| 4 | Austria | 12 | 0.0023 | 8.7731 | 0.0201 |
| 5 | Bahamas | 1 | 0.0002 | 12.3581 | 0.0024 |
| 6 | Barbados | 4 | 0.0008 | 10.3581 | 0.0079 |
| 7 | Belgium | 41 | 0.0078 | 7.0005 | 0.0547 |
| 8 | Bermuda | 1 | 0.0002 | 12.3581 | 0.0024 |
| 9 | Brazil | 3 | 0.0006 | 10.7731 | 0.0062 |
| 10 | Bulgaria | 5 | 0.0010 | 10.0362 | 0.0096 |
| 11 | Canada | 1,331 | 0.2535 | 1.9798 | 0.5019 |
| 12 | Chile | 168 | 0.0320 | 4.9658 | 0.1589 |
| 13 | China | 6 | 0.0011 | 9.7731 | 0.0112 |
| 14 | Croatia | 7 | 0.0013 | 9.5507 | 0.0127 |
| 15 | Cuba | 5 | 0.0010 | 10.0362 | 0.0096 |
| 16 | Czech Republic | 12 | 0.0023 | 8.7731 | 0.0201 |
| 17 | Denmark | 9 | 0.0017 | 9.1882 | 0.0158 |
| 18 | Finland | 7 | 0.0013 | 9.5507 | 0.0127 |
| 19 | France | 763 | 0.1453 | 2.7826 | 0.4044 |
| 20 | Germany | 143 | 0.0272 | 5.1982 | 0.1416 |
| 21 | Greece | 25 | 0.0048 | 7.7142 | 0.0367 |
| 22 | Guyana | 5 | 0.0010 | 10.0362 | 0.0096 |
| 23 | Haiti | 2 | 0.0004 | 11.3581 | 0.0043 |
| 24 | Hungary | 8 | 0.0015 | 9.3581 | 0.0143 |
| 25 | India | 5 | 0.0010 | 10.0362 | 0.0096 |
| 26 | Ireland | 41 | 0.0078 | 7.0005 | 0.0547 |
| 27 | Israel | 2 | 0.0004 | 11.3581 | 0.0043 |
| 28 | Italy | 533 | 0.1015 | 3.3001 | 0.3350 |
| 29 | Jamaica | 16 | 0.0030 | 8.3581 | 0.0255 |
| 30 | Japan | 19 | 0.0036 | 8.1102 | 0.0294 |
| 31 | Kenya | 1 | 0.0002 | 12.3581 | 0.0024 |
| 32 | Korea - Republic of | 4 | 0.0008 | 10.3581 | 0.0079 |
| 33 | Lebanon | 2 | 0.0004 | 11.3581 | 0.0043 |
| 34 | Mexico | 67 | 0.0128 | 6.2920 | 0.0803 |
| 35 | Morocco | 1 | 0.0002 | 12.3581 | 0.0024 |
| 36 | Netherlands | 32 | 0.0061 | 7.3581 | 0.0448 |
| 37 | New Zealand | 89 | 0.0170 | 5.8824 | 0.0997 |
| 38 | Nicaragua | 3 | 0.0006 | 10.7731 | 0.0062 |
| 39 | Philippines | 4 | 0.0008 | 10.3581 | 0.0079 |
| 40 | Poland | 11 | 0.0021 | 8.8987 | 0.0186 |
| 41 | Portugal | 119 | 0.0227 | 5.4633 | 0.1238 |
| 42 | Russian Federation | 8 | 0.0015 | 9.3581 | 0.0143 |
| 43 | Singapore | 1 | 0.0002 | 12.3581 | 0.0024 |
| 44 | Slovak Republic | 3 | 0.0006 | 10.7731 | 0.0062 |
| 45 | Slovenia | 1 | 0.0002 | 12.3581 | 0.0024 |
| 46 | South Africa | 116 | 0.0221 | 5.5001 | 0.1215 |
| 47 | Spain | 191 | 0.0364 | 4.7807 | 0.1739 |
| 48 | Sweden | 12 | 0.0023 | 8.7731 | 0.0201 |
| 49 | Switzerland | 5 | 0.0010 | 10.0362 | 0.0096 |
| 50 | Taiwan | 1 | 0.0002 | 12.3581 | 0.0024 |
| 51 | Thailand | 4 | 0.0008 | 10.3581 | 0.0079 |
| 52 | Trinidad and Tobago | 5 | 0.0010 | 10.0362 | 0.0096 |
| 53 | Turkey | 1 | 0.0002 | 12.3581 | 0.0024 |
| 54 | United Kingdom | 258 | 0.0491 | 4.3469 | 0.2136 |
| 55 | United States | 573 | 0.1091 | 3.1957 | 0.3488 |
| 56 | US Virgin Islands | 4 | 0.0008 | 10.3581 | 0.0079 |
| 57 | Vietnam | 1 | 0.0002 | 12.3581 | 0.0024 |
| | | 5,250 | 1.0000 | 501.9600 | 3.6613 |
| Maximum Entropy | 5.8329 | | | | |
| Entropy Percent | 62.77 | | | | |

Fig. 6

| Dimension | Entropy | Maximum Entropy | Entropy % Maximum | Order |
|---|---|---|---|---|
| Volume | 2.4390 | 6.3576 | 38.36 | 1 |
| Color | 2.2097 | 5.5546 | 39.78 | 2 |
| Product | 2.3649 | 4.3923 | 53.84 | 3 |
| Country | 3.6613 | 5.8329 | 62.77 | 4 |
| Alcohol Level | 4.9810 | 7.5157 | 66.28 | 5 |
| Sweetness | 2.5526 | 3.3219 | 76.84 | 6 |

900

902

| Country | | | | | |
|---|---|---|---|---|---|
| Category Number | Country | Count | Probability | Surprisal | Entropy |
| 1 | Australia | 3 | 0.0053 | 7.5648 | 0.0400 |
| 2 | Austria | 1 | 0.0018 | 9.1497 | 0.0161 |
| 3 | Belgium | 41 | 0.0722 | 3.7922 | 0.2737 |
| 4 | Brazil | 2 | 0.0035 | 8.1497 | 0.0287 |
| 5 | Canada | 347 | 0.6109 | 0.7110 | 0.4343 |
| 6 | China | 4 | 0.0070 | 7.1497 | 0.0504 |
| 7 | Czech Republic | 7 | 0.0123 | 6.3424 | 0.0782 |
| 8 | Denmark | 6 | 0.0106 | 6.5648 | 0.0693 |
| 9 | France | 6 | 0.0106 | 6.5648 | 0.0693 |
| 10 | Germany | 32 | 0.0563 | 4.1497 | 0.2338 |
| 11 | India | 1 | 0.0018 | 9.1497 | 0.0161 |
| 12 | Ireland | 7 | 0.0123 | 6.3424 | 0.0782 |
| 13 | Italy | 3 | 0.0053 | 7.5648 | 0.0400 |
| 14 | Jamaica | 1 | 0.0018 | 9.1497 | 0.0161 |
| 15 | Japan | 1 | 0.0018 | 9.1497 | 0.0161 |
| 16 | Kenya | 1 | 0.0018 | 9.1497 | 0.0161 |
| 17 | Korea - Republic of | 1 | 0.0018 | 9.1497 | 0.0161 |
| 18 | Mexico | 10 | 0.0176 | 5.8278 | 0.1026 |
| 19 | Netherlands | 16 | 0.0282 | 5.1497 | 0.1451 |
| 20 | New Zealand | 2 | 0.0035 | 8.1497 | 0.0287 |
| 21 | Philippines | 1 | 0.0018 | 9.1497 | 0.0161 |
| 22 | Poland | 2 | 0.0035 | 8.1497 | 0.0287 |
| 23 | Portugal | 1 | 0.0018 | 9.1497 | 0.0161 |
| 24 | Singapore | 1 | 0.0018 | 9.1497 | 0.0161 |
| 25 | Slovak Republic | 1 | 0.0018 | 9.1497 | 0.0161 |
| 26 | Slovenia | 1 | 0.0018 | 9.1497 | 0.0161 |
| 27 | South Africa | 1 | 0.0018 | 9.1497 | 0.0161 |
| 28 | Thailand | 4 | 0.0070 | 7.1497 | 0.0504 |
| 29 | Trinidad and Tobago | 1 | 0.0018 | 9.1497 | 0.0161 |
| 30 | Turkey | 1 | 0.0018 | 9.1497 | 0.0161 |
| 31 | United Kingdom | 48 | 0.0845 | 3.5648 | 0.3012 |
| 32 | United States | 13 | 0.0229 | 5.4493 | 0.1247 |
| 33 | Vietnam | 1 | 0.0018 | 9.1497 | 0.0161 |
| | | 568 | 1.0000 | 245.5834 | 2.4188 |
| Maximum Entropy | 5.0444 | | | | |
| Entropy Percent | 47.95 | | | | |

| Dimension | Entropy | Maximum Entropy | Entropy % Maximum | Order |
|---|---|---|---|---|
| Product | 0.0000 | 0.0000 | 0.00 | 1 |
| Country | 2.4188 | 5.0444 | 47.95 | 2 |
| Alcohol Level | 3.4935 | 5.6439 | 61.90 | 3 |
| Volume | 4.0639 | 5.5850 | 72.77 | 4 |
| Sweetness | 1.0000 | 1.0000 | 100.00 | 5 |
| Color | No records | | | |

| Dimension | Entropy | Maximum Entropy | Entropy % Maximum | Order |
|---|---|---|---|---|
| Product | 0.0000 | 0.0000 | 0.0000 | 1 |
| Country | 0.0000 | 0.0000 | 0.0000 | 2 |
| Volume | 2.3804 | 3.4594 | 68.8077 | 3 |
| Alcohol Level | 3.8483 | 4.5236 | 85.0731 | 4 |
| Sweetness | No records | | | |
| Color | No records | | | |

| ID | Product | Country | Colour | Volume | Alcohol | Sweetness | Revenue | Profit Margin |
|---|---|---|---|---|---|---|---|---|
| 1 | Table Wine | Italy | Red | 500 mL | 14% | 10 | 2862 | 37 |
| 2 | Table Wine | France | White | 500 mL | 13,5% | 10 | 2111 | 42 |
| 3 | Table Wine | Italy | White | 500 mL | 13,5% | 10 | 2708 | 72 |
| 4 | Table Wine | Italy | Red | 750 mL | 13% | 10 | 1791 | 37 |
| 5 | Table Wine | Canada | White | 375 mL | 13,6% | 10 | 1961 | 38 |
| 6 | Table Wine | Canada | White | 375 mL | 11% | 10 | 570 | 13 |
| 7 | Table Wine | Canada | White | 375 mL | 10,5% | 10 | 2098 | 29 |
| 8 | Table Wine | France | White | 750 mL | 13,5% | 10 | 2379 | 58 |
| 9 | Table Wine | France | White | 750 mL | 13,5% | 10 | 1007 | 72 |
| 10 | Table Wine | France | White | 375 mL | 14% | 10 | 450 | 19 |
| 11 | Table Wine | France | White | 375 mL | 14% | 10 | 1250 | 63 |
| 12 | Table Wine | France | White | 375 mL | 14% | 10 | 1646 | 18 |
| 13 | Table Wine | France | White | 375 mL | 14% | 10 | 2801 | 39 |
| 14 | Table Wine | France | White | 375 mL | 13,5% | 10 | 718 | 35 |
| 15 | Table Wine | France | White | 375 mL | 13,5% | 10 | 1479 | 40 |
| 16 | Table Wine | France | White | 375 mL | 13,5% | 10 | 1074 | 13 |
| 17 | Table Wine | France | White | 375 mL | 13,5% | 10 | 1432 | 56 |
| 18 | Table Wine | France | White | 375 mL | 13% | 10 | 946 | 11 |
| 19 | Table Wine | France | White | 375 mL | 12,5% | 10 | 986 | 51 |
| 20 | Table Wine | France | White | 375 mL | 13,5% | 10 | 1033 | 35 |
| 21 | Table Wine | France | White | 375 mL | 12% | 10 | 2260 | 65 |
| 22 | Table Wine | Germany | White | 375 mL | 9% | 10 | 2321 | 63 |
| 23 | Table Wine | Germany | White | 375 mL | 8% | 10 | 2171 | 39 |
| 24 | Table Wine | Germany | White | 375 mL | 6,5% | 10 | 2464 | 17 |
| 25 | Table Wine | Germany | White | 375 mL | 10% | 10 | 198 | 19 |
| 26 | Table Wine | France | White | 500 mL | 12,5% | 10 | 2806 | 44 |
| 27 | Table Wine | Austria | White | 375 mL | 10,6% | 10 | 1553 | 51 |
| 28 | Table Wine | Australia | White | 375 mL | 11% | 10 | 2947 | 59 |
| 29 | Ice Wine | Canada | White | 50 mL | 9,5% | 10 | 1074 | 13 |
| 30 | Ice Wine | Canada | White | 50 mL | 11,2% | 10 | 1184 | 60 |

| Box Plot Example 1 | | | | | | | | | | | | | | | | |
|---|---|---|---|---|---|---|---|---|---|---|---|---|---|---|---|---|
| Period | | 1 | 2 | 3 | 4 | 5 | 6 | 7 | 8 | 9 | 10 | 11 | 12 | 13 | 14 | 15 |
| Value | | 8 | 14 | 10 | 9 | 7 | 25 | 12 | 10 | 8 | 6 | 1 | 12 | 16 | 8 | 10 |
| Ordered | | 1 | 6 | 7 | 8 | 8 | 8 | 9 | 10 | 10 | 10 | 12 | 12 | 14 | 16 | 25 |
| Lower Quartile | 8 | | | | | | | | | | | | | | | |
| Median | 10 | | | | | | | | | | | | | | | |
| Upper Quartile | 12 | | | | | | | | | | | | | | | |
| Inter Quartile Range | 4 | | | | | | | | | | | | | | | |
| Inter Quartile Range Multiplier | 1.5 | | | | | | | | | | | | | | | |
| Lower Inner Fence | 2 | | | | | | | | | | | | | | | |
| Upper Inner Fence | 18 | | | | | | | | | | | | | | | |
| Inter Quartile Range Multiplier | 3 | | | | | | | | | | | | | | | |
| Lower Outer Fence | -4 | | | | | | | | | | | | | | | |
| Upper Outer Fence | 24 | | | | | | | | | | | | | | | |
| The first value above the Lower Inner Fence | 6 | | | | | | | | | | | | | | | |
| The first value below the Upper Inner Fence | 16 | | | | | | | | | | | | | | | |
| Number of suspect outliers below the median | 1 | Period | 11 | Value | 1 | | | | | | | | | | | |
| Number of suspect outliers above the median | 0 | | | | | | | | | | | | | | | |
| Total | 1 | | | | | | | | | | | | | | | |
| Number of extreme outliers below the median | 0 | | | | | | | | | | | | | | | |
| Number of extreme outliers above the median | 1 | Period | 6 | Value | 25 | | | | | | | | | | | |
| Total | 1 | | | | | | | | | | | | | | | |
| Total number of outliers | 2 | | | | | | | | | | | | | | | |

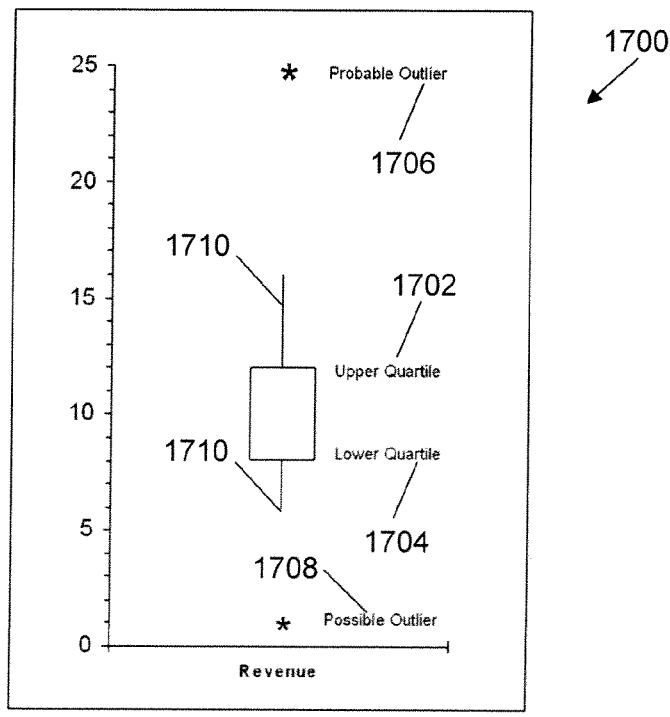

FIG. 17

| Example Box Plot 2 | | | | | | | | | | | | | | | | |
|---|---|---|---|---|---|---|---|---|---|---|---|---|---|---|---|---|
| Period | | 1 | 2 | 3 | 4 | 5 | 6 | 7 | 8 | 9 | 10 | 11 | 12 | 13 | 14 | 15 |
| Value | | 18 | 14 | 16 | 18 | 15 | 18 | 19 | 10 | 8 | 6 | 31 | 12 | 16 | 8 | 10 |
| Ordered | | 6 | 8 | 8 | 10 | 10 | 12 | 14 | 15 | 16 | 16 | 18 | 18 | 18 | 19 | 31 |
| Lower Quartile | 10 | | | | | | | | | | | | | | | |
| Median | 15 | | | | | | | | | | | | | | | |
| Upper Quartile | 18 | | | | | | | | | | | | | | | |
| Inter Quartile Range | 8 | | | | | | | | | | | | | | | |
| Inter Quartile Range Multiplier | 1.5 | | | | | | | | | | | | | | | |
| Lower Inner Fence | -2 | | | | | | | | | | | | | | | |
| Upper Inner Fence | 30 | | | | | | | | | | | | | | | |
| Inter Quartile Range Multiplier | 3 | | | | | | | | | | | | | | | |
| Lower Outer Fence | -14 | | | | | | | | | | | | | | | |
| Upper Outer Fence | 42 | | | | | | | | | | | | | | | |
| The first value above the Lower Inner Fence | 6 | | | | | | | | | | | | | | | |
| The first value below the Upper Inner Fence | 19 | | | | | | | | | | | | | | | |
| Number of suspect outliers below the median | 0 | | | | | | | | | | | | | | | |
| Number of suspect outliers above the median | 1 | Period | 11 | Value | 31 | | | | | | | | | | | |
| Total | 0 | | | | | | | | | | | | | | | |
| Number of extreme outliers below the median | 0 | | | | | | | | | | | | | | | |
| Number of extreme outliers above the median | 0 | | | | | | | | | | | | | | | |
| Total | 0 | | | | | | | | | | | | | | | |
| Total number of outliers | 0 | | | | | | | | | | | | | | | |

FIG. 18

GUIDED GRAPHICAL NAVIGATION THROUGH MULTIDIMENSIONAL DATABASES

BRIEF DESCRIPTION OF THE INVENTION

This invention relates generally to multidimensional databases. More particularly, this invention relates to techniques for fast and informative navigation through the data of a multidimensional database.

BACKGROUND OF THE INVENTION

Business Intelligence (BI) generally refers to software tools used to improve business enterprise decision-making. These tools are commonly applied to financial, human resource, marketing, sales, customer and supplier analyses. More specifically, these tools can include: reporting and analysis tools to present information, content delivery infrastructure systems for delivery and management of reports and analytics, data warehousing systems for cleansing and consolidating information from disparate sources, and data management systems, such as relational databases or On Line Analytic Processing (OLAP) systems used to collect, store, and manage raw data.

OLAP tools are a subset of business intelligence tools. There are a number of commercially available OLAP tools including Business Objects Voyager™ which is available from Business Objects Americas of San Jose, Calif. An OLAP tool is a report generation tool that is configured for ad hoc analyses. OLAP generally refers to a technique of providing fast analysis of shared information stored in a multi-dimensional database. OLAP systems provide a multidimensional conceptual view of data, including full support for hierarchies and multiple hierarchies. This framework is used because it is a logical way to analyze businesses and organizations. In some OLAP tools the data is arranged in a schema which simulates a multidimensional schema. The multidimensional schema means redundant information is stored, but it allows for users to initiate queries without the need to know how the data is organized.

There are other report generation tools, including tools that couple to a metadata layer that overlies a data source. The metadata layer can be a semantic metadata layer, or semantic layer, which includes metadata about the type of data within the data source. Some metadata layers map the data source fields into familiar terms, such as, product, customer, or revenue. The metadata layer can provide a multidimensional view of information in a data source. There are a number of commercially available report generation tools that are characterized by a semantic layer, including Business Objects Web Intelligence™, which is available from Business Objects Americas of San Jose, Calif.

There are known techniques for graphically portraying quantitative information. The techniques are used in the fields of statistical graphics, data visualization, and the like. Charts, tables, and maps are visualizations of quantitative information. Visualizations are produced from data in a data source (e.g., an OLAP cube, relational database). A visualization is a graphic display of quantitative information. Types of visualizations include charts, tables, and maps. Visualizations can reveal insights into the relationships between data. The data within an OLAP cube may be comprised of categorical dimensions, numerical measure dimensions, and time dimensions. A categorical dimension is a data element that categorizes each item in a data set into non-overlapping regions. A numerical measure dimension comprises data defined by a computation, such as a sum or average. For example, an OLAP cube of Beverages might have categorical dimensions such as Product, Country, Color, Volume, Alcohol Level, and Sweetness and numerical measures such as Revenue and Profit margin. The time dimension comprises data grouped in accordance with a time metric. For example, time dimensions may include Quarter 1, Quarter 2, Quarter 3, and Quarter 4. Multidimensional databases undertake to provide fast navigation and informative presentation of data inside an OLAP cube.

However, existing multidimensional databases have limitations with regards to their ability to deliver these results. Existing multidimensional databases are user driven, giving little direction into effective navigation of the data therein. The problem has been further augmented as the data volumes within OLAP cubes have increased and forced data navigation to become even more complex.

In view of the foregoing, it would be highly desirable to provide an improved technique for guided navigation through the data within an OLAP cube. In particular, it would be highly desirable to provide a method for guided graphical navigation through the categorical, numerical measures, and time dimensions of an OLAP cube.

SUMMARY OF INVENTION

The invention includes a computer readable storage medium with executable instructions to analyze a categorical dimension of multi-dimensional data as a function of entropy to form entropy results. The entropy results are plotted as a stacked bar chart. A user graphically navigates through the stacked bar chart.

BRIEF DESCRIPTION OF THE FIGURES

The invention is more fully appreciated in connection with the following detailed description taken in conjunction with the accompanying drawings, in which:

FIG. 3 illustrates entropy calculations performed in accordance with an embodiment of the invention.

FIG. 4 illustrates a flattened file produced in accordance with an embodiment of the invention.

FIG. 5 illustrates a summary of entropy calculations for an exemplary categorical dimension Product.

FIG. 6 illustrates a summary of entropy calculations for an exemplary categorical dimension Country.

FIG. 9 illustrates a table of recalculated entropy values after the user has selected a specific categorical dimension in the stacked bar chart of FIG. 8.

FIG. 10 illustrates a summary of results for the recalculated entropy values after the user has selected a specific categorical dimension in the stacked bar chart of FIG. 8.

FIG. 15 illustrates measure dimension values processed in accordance with an embodiment of the invention.

FIG. 16 illustrates a table summarizing the criteria that will be used for the box plot of FIG. 17.

FIG. 17 illustrates an exemplary box plot for a numerical measure defined by the criteria summarized in FIG. 16.

FIG. 18 illustrates a table summarizing the criteria that will be used for the box plot of FIG. 19.

Like reference numerals refer to corresponding parts throughout the several views of the drawings.

DETAILED DESCRIPTION OF THE INVENTION

Figure 1:
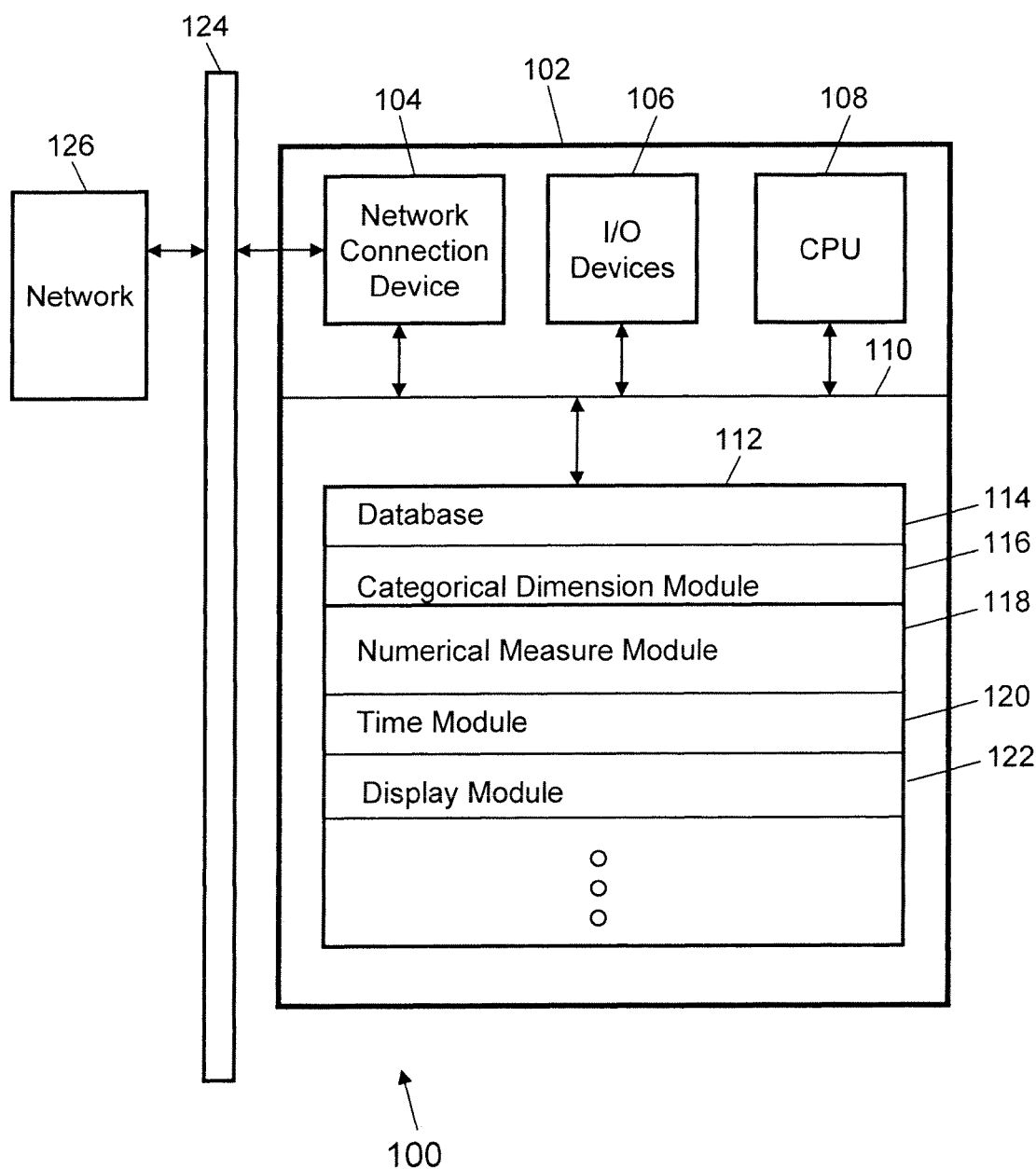
FIG. 1 illustrates a computer configured in accordance with an embodiment of the invention.

FIG. 1 illustrates a computer network 100 that may be operated in accordance with an embodiment of the invention. The computer network 100 includes a computer 102, which, in general, may be a client computer or a server computer. In the present embodiment of the invention, the computer 102 is a server computer including conventional server computer components. As shown in FIG. 1, the computer 102 includes a Central Processing Unit ("CPU") 108 that is connected to a network connection device 104 and a set of input/output devices 106 (e.g., a keyboard, a mouse, a display, a printer, a speaker, and so forth) via a bus 110. The network connection device 104 is connected to network 126 through the network transport medium 124, which may be any wired or wireless transport medium.

The CPU 108 is also connected to a memory 112 via the bus 110. The memory 112 stores a set of executable programs. One executable program is the categorical dimension module 116. The categorical dimension module 116 includes executable instructions to access a data source to construct a chart characterizing the categorical dimensions in an OLAP cube. By way of example, the data source may be database 114 resident in memory 112. The data source may be located anywhere in the network 126. The categorical dimension module 116 also includes executable instructions to allow the user to graphically navigate through the chart.

As shown in FIG. 1, the memory 112 also contains a numerical measure module 118. The numerical measure module 118 plots the numerical measures in an OLAP cube. The numerical measure module 118 includes executable instructions to access a data source to process numerical measures. By way of example, the data source may be database 114 resident in memory 112. The memory 112 also contains a time module 120 that includes executable instructions to access a data source to generate visualizations portraying different time periods. By way of example, the data source may be database 114 resident in memory 112. The memory 112 also contains a display module 122 that can work in conjunction with the categorical dimension module 116, numerical measure module 118, and the time module 120 to display graphical representations of the categorical, numerical measure, and time dimensions within an OLAP cube.

While the various components of memory 112 are shown residing in the single computer 102, it should be recognized that such a configuration is not required in all applications. For instance, the categorical dimension module 116 may reside in a separate computer (not shown in FIG. 1) that is connected to the network 126. Similarly, separate modules of executable code are not required. The invention is directed toward the operations disclosed herein. There are any number of ways and locations to implement those operations, all of which should be considered within the scope of the invention.

Figure 2:
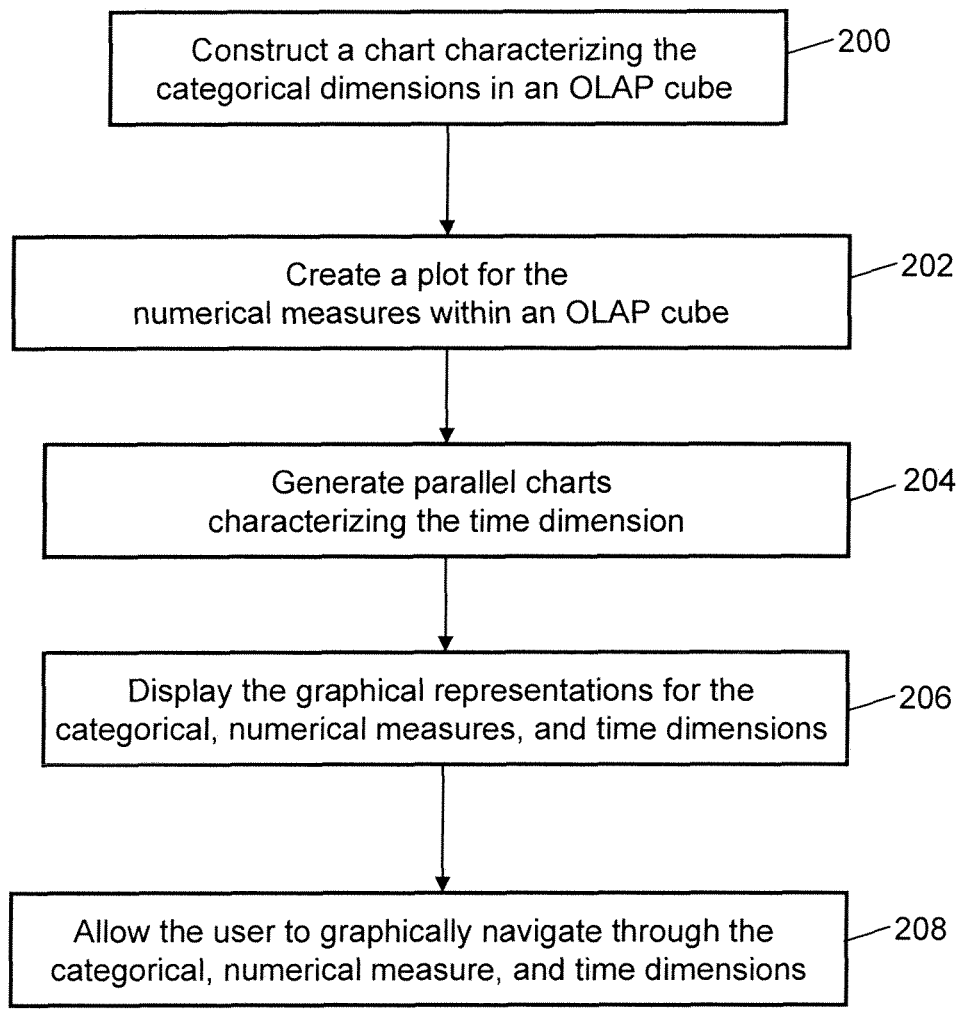
FIG. 2 illustrates a series of processing operations associated with an embodiment of the invention.

FIG. 2 illustrates processing operations associated with an embodiment of the invention. The first processing operation shown in FIG. 2 is to construct a chart characterizing the categorical dimensions in an OLAP cube 200. In one embodiment of the invention, this is implemented with executable code of the categorical dimension module 116. An OLAP cube may be comprised of several categorical dimensions. For instance, a business enterprise using an OLAP cube for beverages may have categorical dimensions such as Product, Country, Color, Volume, Alcohol Level, and Sweetness. In order to determine the ordering of the chart characterizing the categorical dimensions, the categorical dimension module 116 calculates the entropy values for each category to establish its relative value of information.

Entropy is a concept from information theory that may be used as a measure of the uncertainty associated with a specific categorical dimension, and thus the value of the information in that categorical dimension. Entropy may be considered a measure of the amount of information that is missing. Claude Shannon devised an entropy measure to characterize the amount of information transmitted in a message.

In one embodiment of the invention, the formula for entropy, H(x), of a categorical dimension is $$H(x) = \sum_{i=1}^{n} p_i \log_2(1/p_i)$$

where $p_i$ is the probability of each category, from i=1 to n, occurring in the categorical dimension, and is calculated as the frequency or distinct count of the value of each category divided by the sum of frequencies for all values in the category. The term $\log_2(1/p_i)$ is commonly referred to as the surprisal (i.e., the degree to which you are surprised to see the result).

FIG. 4 illustrates an example of the entropy value for different distributions or probabilities of five categories in a dimension. Where a dimension has only one category, there is no uncertainty and the entropy value is 0. Where each category is equally likely, the entropy value is 2.3219, which is in fact the maximum entropy or maximum uncertainty.

Maximum entropy occurs when all outcomes in a categorical dimension are equally likely so that:

$$p_i = 1/N$$

$$H(x) = \sum_{i=1}^{n} 1/N * \log_2(1/1/N)$$

$$H(x) = \log_2(N)$$

Relying upon the example of FIG. 4. N is 5 and $\log_2 5$ is 2.3219.

The value of the entropy calculation is a function of the probability distribution of outcomes, $p_i$, and the number of outcomes, N. Therefore, one criterion for ordering the categorical dimensions in the chart constructed by the categorical dimension module 116 is to calculate the entropy values as a percent of the maximum entropy value. Consider an OLAP cube with the following dimensions:

A and members A1, A2
B and members B1, B2, B3
C and members C1, C2
Measures M1, M2
Time H1, H2, Total This cube of information may be flattened into a two dimensional File, where each dimension and measure is represented in a column and each row represents each unique combination of the categorical dimensions in the OLAP cube. This processing results in the flattened file of FIG. 4.

Now, consider an OLAP cube with categorical dimensions: product, country, color, volume, alcohol level and sweetness. The cube has measures of revenue and profit margin. Time is grouped in accordance with quarter 1, quarter 2, quarter 3, quarter 4 and year. This cube may be flattened into a two dimensional file in which each dimension and measure is represented in a column and each row represents each unique combination of the categorical dimensions in the OLAP cube. Entropy calculations may then be applied to the flattened file. To illustrate, FIG. 5 shows a table 500 with the sample entropy calculation for the categorical dimension Product 514. The Product categorical dimension has 21 distinct categories 502 having a frequency as shown in the column count 504. The probability 506 is determined by dividing the count 504 by the total sum of frequencies for the categorical dimension.

Once the probability for each category is found, the categorical dimension module 116 may then calculate the entropy associated with the categorical dimension. In this example, the total entropy 508 is 2.3649, the maximum entropy 510 of the categorical dimension is 4.3923, and the entropy percent 512 (i.e. total entropy 508/maximum entropy 510) is 53.84.

Figures 7, 8:
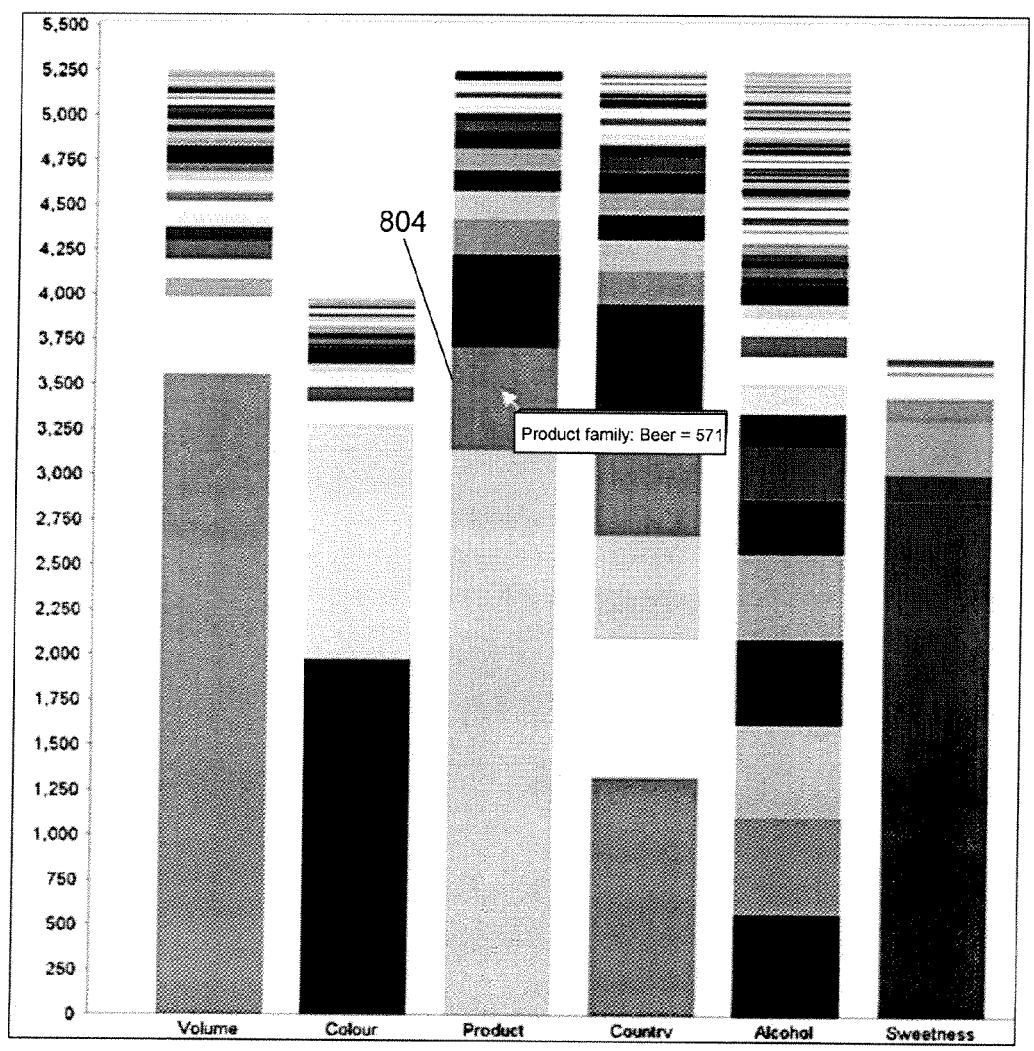
FIG. 7 illustrates a summary of results for the entropy calculations for a set of categorical dimensions.
FIG. 8 illustrates a stacked bar chart whose order is defined by the entropy calculations shown in FIG. 7.

FIG. 6 shows an analogous table 600 for the categorical dimension Country 602. The total entropy 604 is 3.6613, the maximum entropy 606 of the categorical dimension is 5.8329, and the entropy percent 608 is 62.77. The same analysis is applied to the other categorical dimensions (e.g. Color, Volume, Alcohol Level, and Sweetness) within the OLAP cube. FIG. 7 shows a table 700 summarizing the results of the entropy calculations for each categorical dimension.

Categorical dimensions may be charted in the order of increasing entropy percent. FIG. 8 shows a stacked bar chart 800, whose order is defined by the entropy calculations characterized in the table 700 for Volume, Color, Product, Country, Alcohol, and Sweetness. Each categorical dimension is broken up by the number of specific categories that are present in the categorical dimension, For instance, the Product dimension has 21 distinct categories so that the stacked bar chart for Product 802 consists of 21 collective rows.

The user may now navigate through the categorical dimension of the chart. In one embodiment of the invention, this is accomplished with executable instructions of the categorical dimension module 116. The categorical dimension module 116 allows the user to select a specific category within a categorical dimension to give a graphical visualization for all of the categorical dimensions in the OLAP cube. For example, as shown in FIG. 8, the user may select the category Beer 804, having 571 rows, within the categorical dimension Product 802. Once the user selects a specific category within a categorical dimension, the categorical dimension module 116 may recalculate the entropy values based on the user selection to determine the new ordering of the chart. To illustrate, FIG. 9 displays a table 900 of recalculated entropy values for the categorical dimension Country 902 after the user has selected Beer 804 within the categorical dimension Product 802.

Accordingly, the table 900 presents the recalculated entropy values for the Country 902 dimension when the Product 802 dimension is limited to the Beer 804 category. Similarly, the same analysis is applied to other categorical dimensions within the OLAP cube.

FIG. 10 shows a table 1000 summarizing the recalculated entropy values for all the categorical dimensions 1008 (e.g. Product, Country, Alcohol Level, Volume, Sweetness, and Color) for the category Beer 1004 in the Product 1002 dimension and the new order 1004 for the new graphical visualization. As shown in FIG. 10, the Product dimension 1002 has no entropy (i.e. no uncertainty) because the user has limited the categorical dimension to a specific category (i.e., Beer 804).

Figure 11:
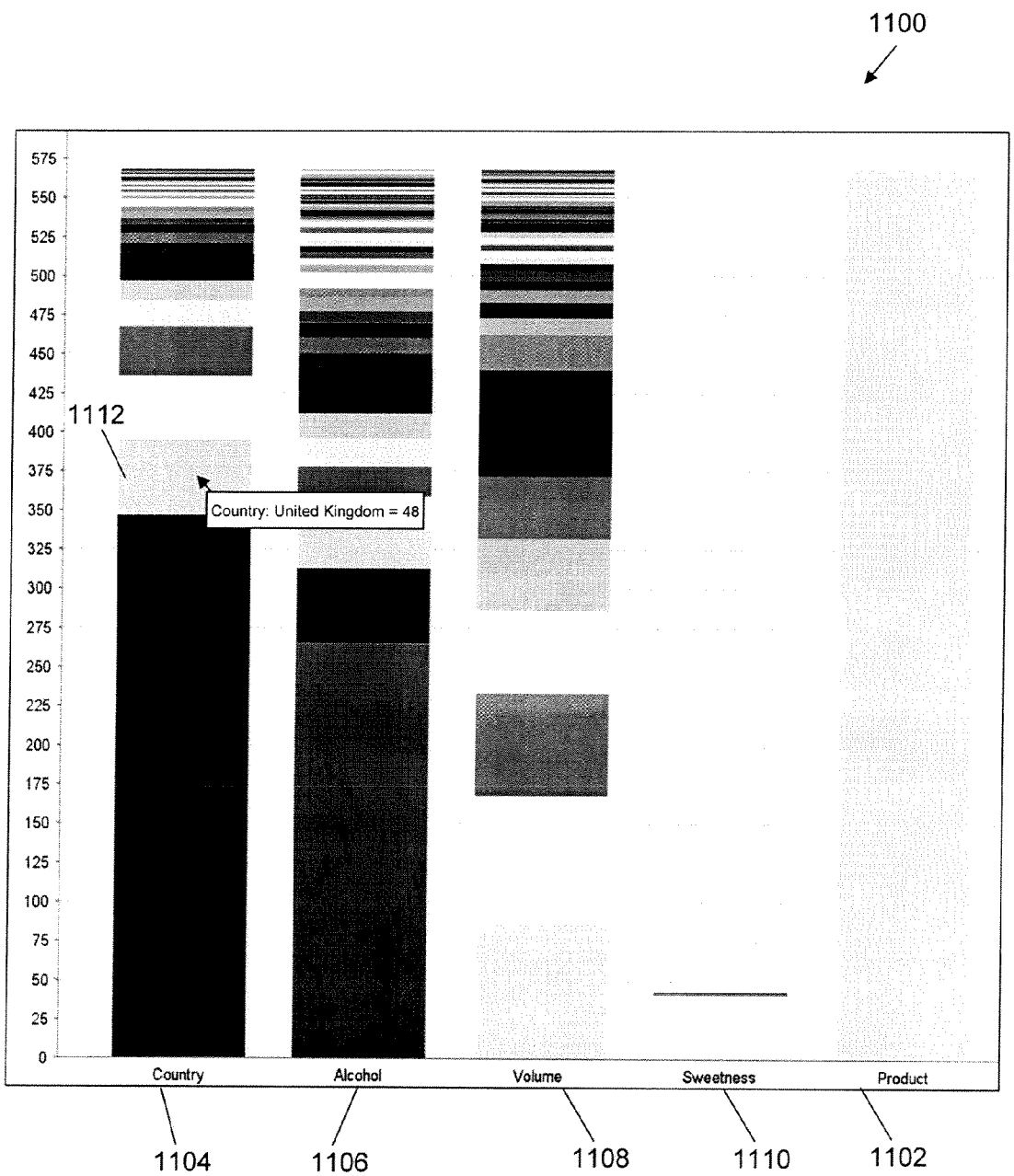
FIG. 11 illustrates a stacked bar chart whose order is defined by the entropy calculations shown in FIG. 10.

FIG. 11 shows a stacked bar chart 1100, whose order is defined by the categorical dimensions characterized in the table 1000 for Country 1104. Alcohol 1106, Volume 1108. Sweetness 1110, and Product 1102 (note that Color 1006 is omitted from the chart as there are no records for this categorical dimension). While the categorical dimensions are normally charted in the order of increasing entropy percent, categorical dimensions with a zero entropy percent (e.g., Product 1102) may be displayed last as they are unlikely to be chosen for the next visualization.

Figures 12, 13:
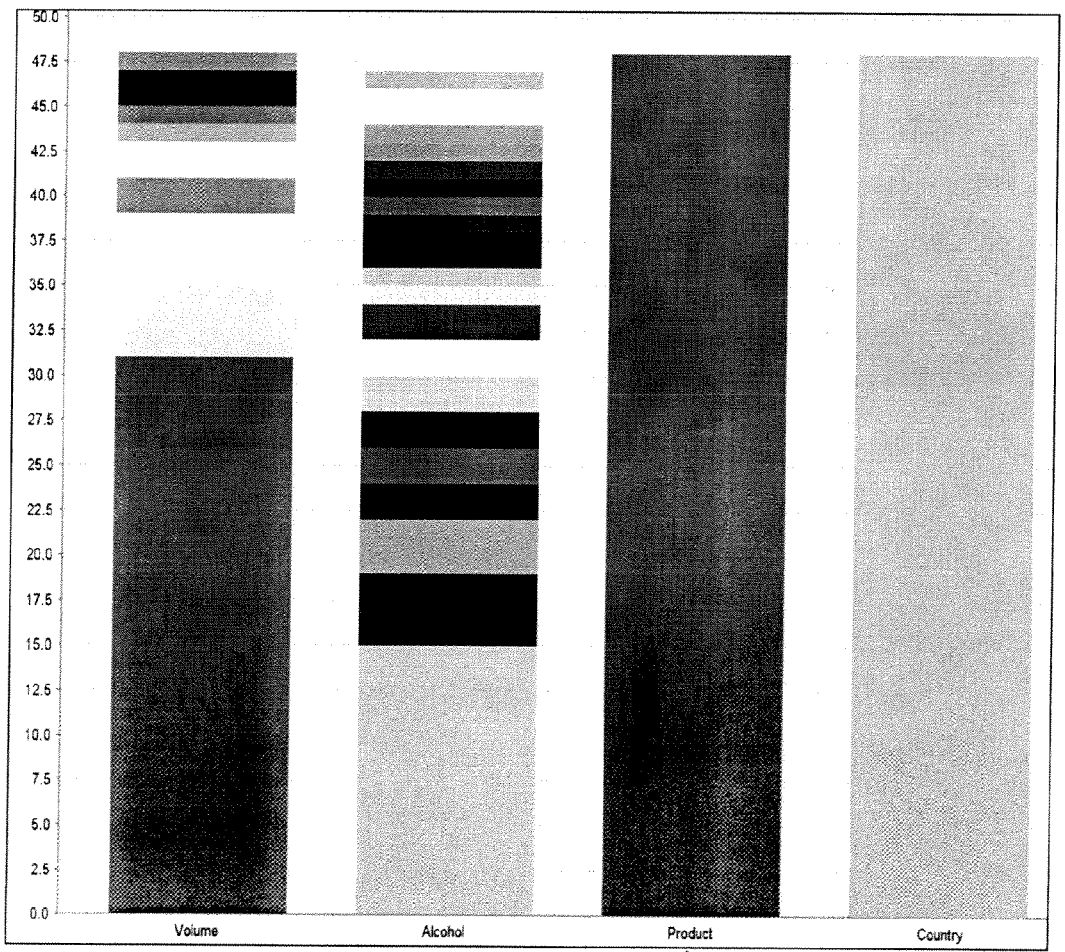
FIG. 12 illustrates a summary of results for the recalculated entropy values after the user has selected a specific categorical dimension in the stacked bar chart of FIG. 11.
FIG. 13 illustrates a stacked bar chart whose order is defined by the entropy calculations of FIG. 12.

The user may then continue to navigate through the data by selecting another categorical dimension or by choosing to move back to any previous visualization. For instance, the user may choose to select the category United Kingdom 1112, having 48 rows, in the dimension Country 1104 to navigate. FIG. 12 shows a table 1200 summarizing the entropy calculations for the categorical dimensions 1202 (e.g., Product, Country, Volume, and Alcohol level) and their respective chart order 1204 after the category United Kingdom 1112 has been selected by the user in chart 1100. As there is only one value (e.g. Beer 804) in the Product categorical dimension, the entropy value is zero (i.e., there is no uncertainty). Similarly, the entropy associated with the Country categorical dimension is also zero (i.e., there is no uncertainty) because there is only one value (e.g., United Kingdom) in the dimension.

FIG. 13 shows the chart 1300 for the entropy calculations of the table 1200. Once again, the dimensions with no entropy (e.g., Product 1302 and Country 1304) are ordered last despite having the least entropy because it is unlikely that a user will choose them for the next visualization.

Figure 14:
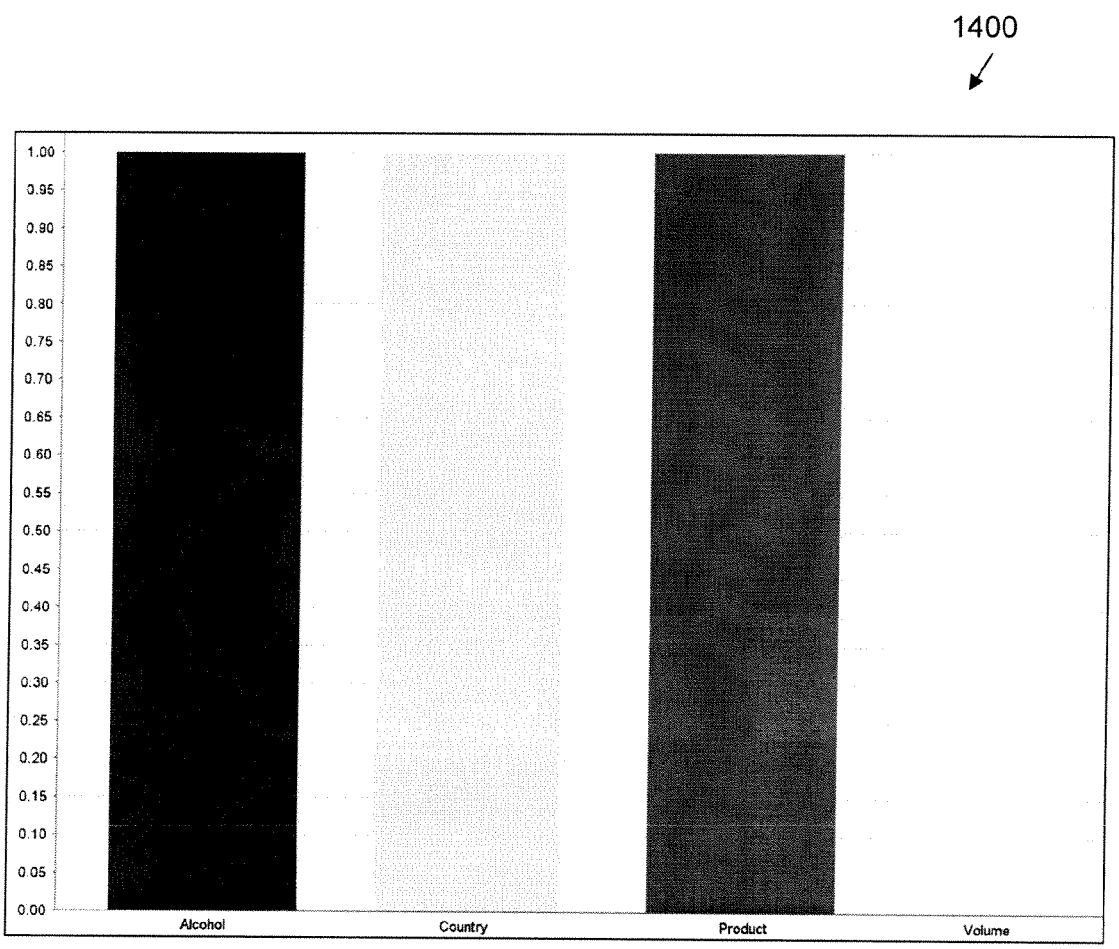
FIG. 14 illustrates a stacked bar chart where the user may no longer choose a specific categorical dimension to navigate.

In the same way, the user may continue to navigate through the categorical dimensions by continuing to select specific categories within a dimension or choosing to return to a previous visualization. Each time the user navigates to an alternate visualization, new entropy values are calculated based on the user selection to determine the ordering of the next chart. Ultimately, the user may reach a point where an additional selection cannot be made. To illustrate, FIG. 14 shows a chart 1400 where the user may no longer select a specific category in a dimension because there is no longer any entropy associated with any of the categorical dimensions. At this point, the user may choose to return to any previous visualization and continue graphical navigation.

Returning to FIG. 2, the next processing operation is to create a plot for the numerical measures within an OLAP cube 202. In one embodiment of the invention, the numerical measure module 118 may create a box plot of the numerical measures associated with the categorical dimensions of an OLAP cube. The members of the numerical measures dimensions are characterized as comprising a vector of continuous numeric values. For example, the members for the numerical measures associated with the categorical dimensions used above may include Revenue and Profit Margin. FIG. 15 includes an exemplary first 30 records consistent with the foregoing example.

As discussed above, the user may graphically navigate through the categorical dimensions in an OLAP cube. Accordingly, as the user navigates through the categorical dimensions, the contents of the vectors for the numerical measures will change. Similar to the categorical dimensions, the user is able to navigate through the continuous numeric data within the numerical measures dimension with the aid of a suggested navigation path. Selections from the numerical measures dimension would conversely change the contents of the categorical dimensions.

One embodiment for the graphical representation of the numerical measures dimension is the box plot (i.e., whisker plot). The box plot of the numerical measures dimension is displayed in such a way so as to identify a suggested path for navigation. In order to create a box plot for a member of the numerical measures dimension, the following criteria should be determined from the members vector of continuous numeric values: the median, the upper quartile ("UQ") (i.e. the $75^{th}$ percentile), the lower quartile ("LQ") (i.e., the $25^{th}$ percentile), the inter quartile range ("IQR") (i.e., the UQ-the LQ), the upper inner fence (i.e., the UQ+1.5*IQR), the lower inner fence (i.e., the LQ−1.5*IQR), the upper outer fence (i.e., UQ+3.0*IQR), the lower outer fence (i.e., the LQ−3.0*IQR), the first value above the lower inner fence, and the first value below the upper inner fence. Values outside of the outer fences are referred to herein as probable or extreme outliers, Values between the inner and outer fences are referred to herein as suspect or possible outliers.

By way of example, assume that the vector of numeric values for the measure Revenue is 10, 11, 10, 9, 10, 24, 11, 12, 10, 6, 1, 11, 16, 13, and 12. FIG. 16 shows a table 1600 summarizing the criteria for the box plot for the measure Revenue. Using this criteria, FIG. 17 shows a box plot 1700 for the measure Revenue with an Upper Quartile 1702, a Lower Quartile 1704, Probable Outlier 1706, and Possible Outlier 1708. Naturally, other embodiments are possible. For example, the mean may be used instead of the median; similarly, the standard deviation may be used instead of the inter-quartile range. Variations in the median based box plot include showing the median within the box, drawing the "whiskers" 1710 with a horizontal line at the end to form a T; drawing the horizontal line from the minimum to the maximum values; the box itself being drawn from the lower and upper inter fences, etc. Given that the actual box only represents 50% of the values, being the difference between the upper and lower quartile, a variation could be to draw the box from the $80^{th}$ percentile to the $20^{th}$ percentile, and thus show 60% of the values. The percentiles drawn could be a variable. Another variation is several boxes drawn to shown the $10^{th}$, $20^{th}$, $30^{th}$..., to $90^{th}$ percentiles, with values outside the range shown as the extreme values and possibly represented by points, circles or asterisks.

Figure 19:
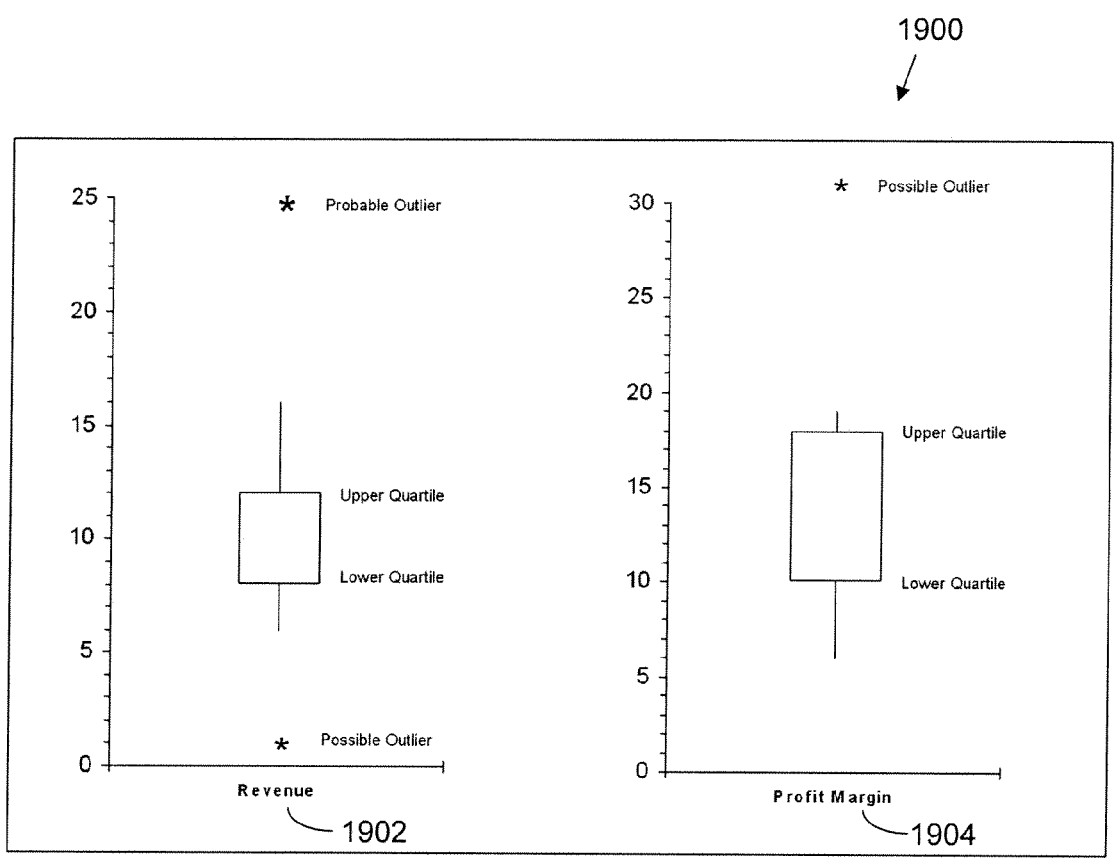
FIG. 19 illustrates a set of box plots formed with the data summarized in FIG. 18.

Expanding on the foregoing example, consider the following profit margin values: 18, 14, 16, 18, 15, 18, 19, 10, 8, 6, 31, 12, 16, 8, and 10. These values result in the calculations shown in FIG. 18. FIG. 19 shows box plots 1900 for the Revenue 1902 and Profit Margin 1904 numerical measures. As with the visualizations of the categorical dimensions, the ordering of the members along the x-axis is indicative of information content. The value of information content associated with the numerical measures may very widely depending on the user and, thus, different criteria may be used to determine the ordering of box plots along the x-axis. By way of example, suggested criteria is the total number of outliers in the numerical measure. For example, Table 1 shows a summary of various calculations associated with outliers identified in the numerical measure Revenue.

TABLE 1

| Suspect outliers below the median | |
|---|---|
| Period | 11 |
| Value | 1 |
| Distance from Median | −9 |
| Distance from Median % | −75.00 |
| Distance from Median Absolute | 9 |
| Distance from Median Absolute % | 75.00 |
| Extreme outliers above the median | |
| Period | 6 |
| Value | 25 |
| Distance from Median | 15 |
| Distance from Median % | 150.00 |
| Distance from Median Absolute | 15 |
| Distance from Median Absolute % | 150.00 |
| Criteria | |
| Total number of outliers | 2 |
| Total number of extreme outliers | 1 |
| Total number of outliers % total number of values | 13.33 |
| Total number of extreme outliers % total number of values | 6.67 |
| Highest absolute distance from median % | 150.00 |

Table 2 shows a summary of various calculations associated with the outliers identified in the numerical measure Profit Margin.

TABLE 2

| Suspect outliers above the median | |
|---|---|
| Period | 11 |
| Value | 31 |
| Distance from Median | 16 |
| Distance from Median % | 106.67 |
| Distance from Median Absolute | 16 |
| Distance from Median Absolute % | 106.67 |
| Criteria | |
| Total number of outliers | 1 |
| Total number of extreme outliers | 0 |
| Total number of outliers % total number of values | 6.67 |
| Total number of extreme outliers % total number of values | 0.00 |
| Highest absolute distance from median % | 106.67 |

Accordingly, as a higher number of total outliers was identified in the member Revenue than the member Profit Margin the Revenue box plot 1902 is ordered first along the x-axis in FIG. 19.

Various criteria may be used to determine the value of information associated with numerical measures. For example, alternative criteria may be the spread of values in a measure characterized by the skewness and kurtorsis of the set of values in a numerical measure. Skewness is a measure of the asymmetry of the values in a distribution and could therefore be used to analyze a numerical measure. A positive skew shows that the majority of the distribution is concentrated to the left of the mode. A negative skew shows that the majority of the distribution is concentrated to the right of the mode. Kurtosis is a measure of the peakedness of a distribution. A distribution with zero kurtosis is called mesokurtic. The most prominent example of a mesokurtic distribution is the normal distribution. A distribution with positive kurtosis is called leptokurtic. A leptokurtic distribution has a more acute peak around the mean than the normal distribution. A distribution with negative kurtosis is called platykurtic. A platykurtic distribution has a smaller peak around the mean. The criteria for ordering measures along the x-axis could therefore be the degree of peakedness or conversely the degree of flatness.

Figure 20:
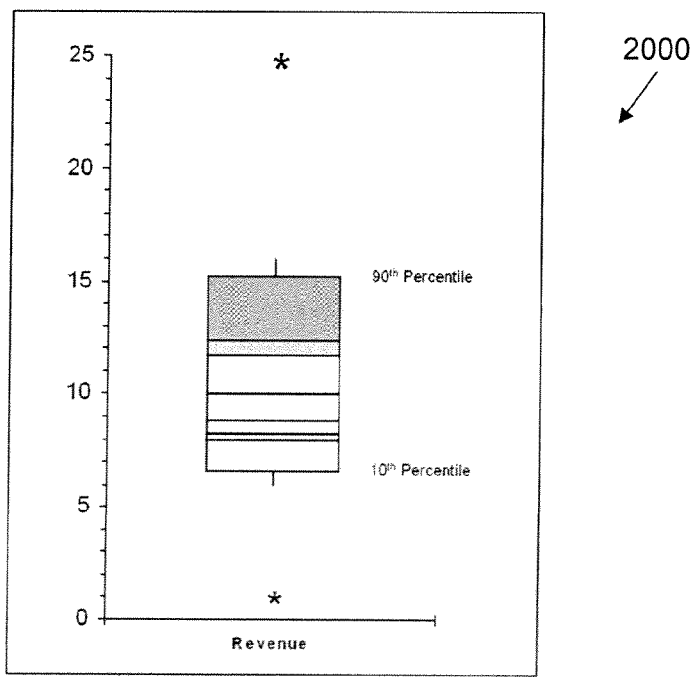
FIG. 20 illustrates an exemplary box plot charted with various percentile ranges in accordance with an embodiment of the invention.

The user may now navigate through the box plots by selecting: a specific outlier, the specific set of values in the box (i.e., between the LQ and UQ) of the plot, or the specific values between the upper and lower fences of the plot. Additionally, if more percentiles were plotted in the box plot, the user may select a specific percentile range to navigate into. For example, FIG. 20 shows an exemplary box plot 2000 for the numeric measure Revenue plotted with various percentile ranges (e.g., $10^{th}, 20^{th}, \ldots, 90^{th}$). The user may select any percentile range of interest.

Figure 21:
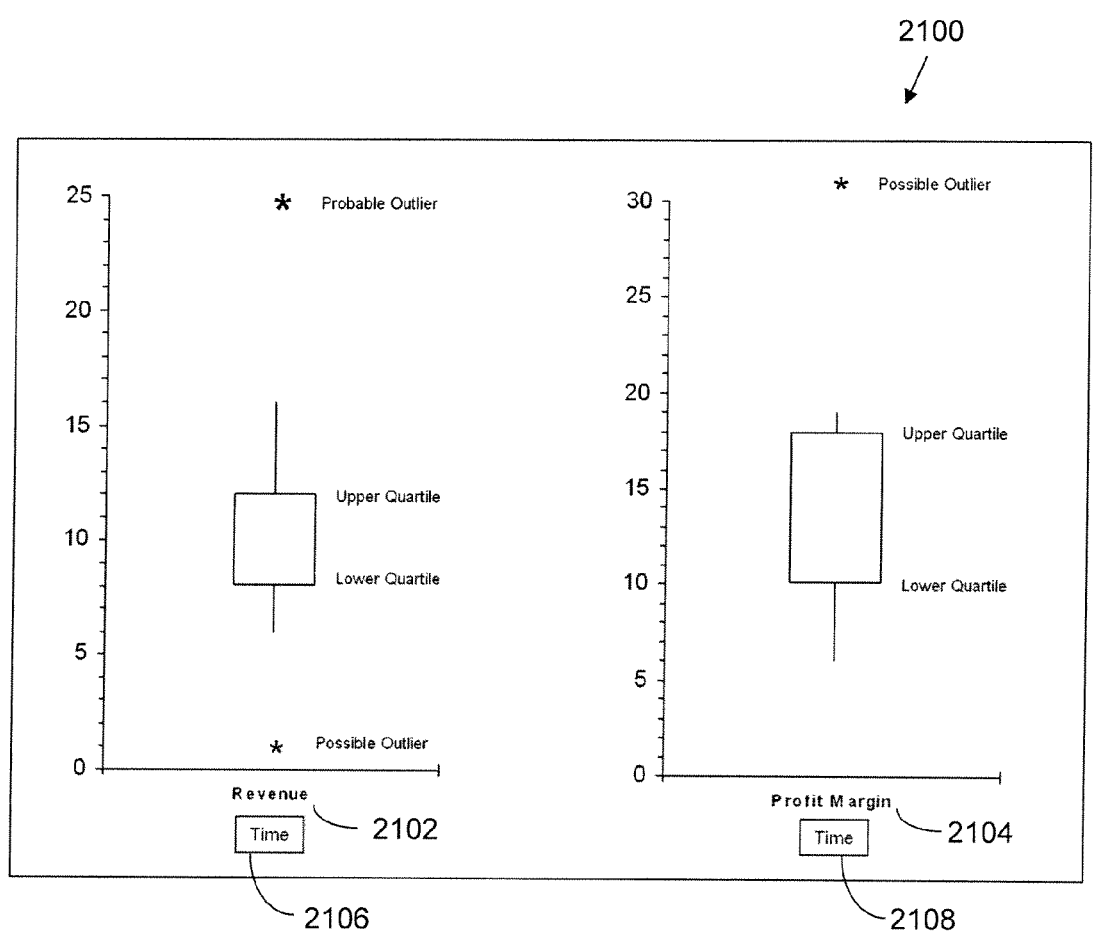
FIG. 21 illustrates exemplary box plots formed in accordance with an embodiment of the invention.
Figure 22:
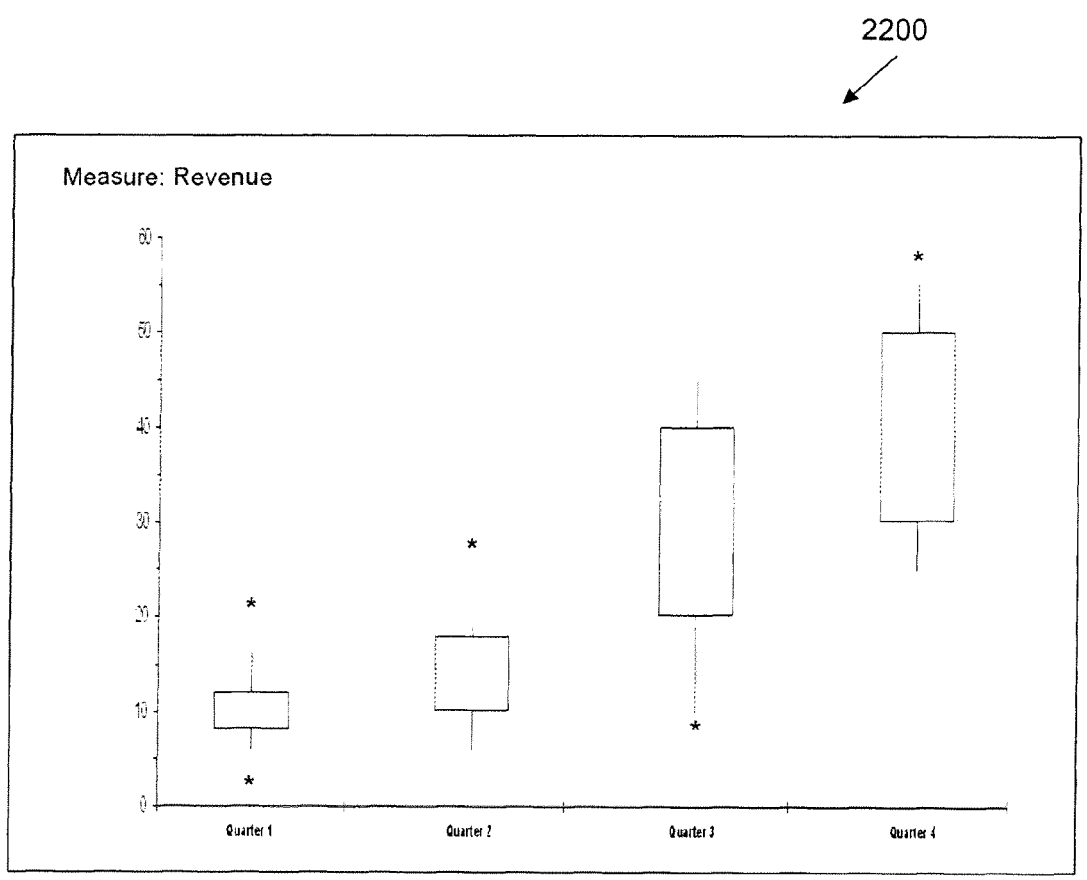
FIG. 22 illustrates exemplary box plots for a numerical measure as a function of time.

Returning to FIG. 2, the next processing operation is to generate parallel charts characterizing the time dimension 204. Multidimensional data will frequently include a dimension of time. The time module 120 may generate parallel charts characterizing different time periods for the categorical dimensions and numerical measures within an OLAP cube. The user may navigate through the time dimension by selecting the time associated with a specific numerical measure. For example, FIG. 21 shows the box plots 2100 for the numerical measure Revenue 2102 and Profit Margin 2104 with the time dimensions 2106, 2108 for each numerical measure. The user may then select the time for a numerical measure to view the various box plots of the numerical measure over the dimension of time. For instance, the time may be defined by Quarter 1, Quarter 2, Quarter 3, and Quarter 4. FIG. 22 shows a chart 2200 with exemplary box plots 1800 for the time dimension of the numerical measure Revenue of box plot 1502.

Figure 23:
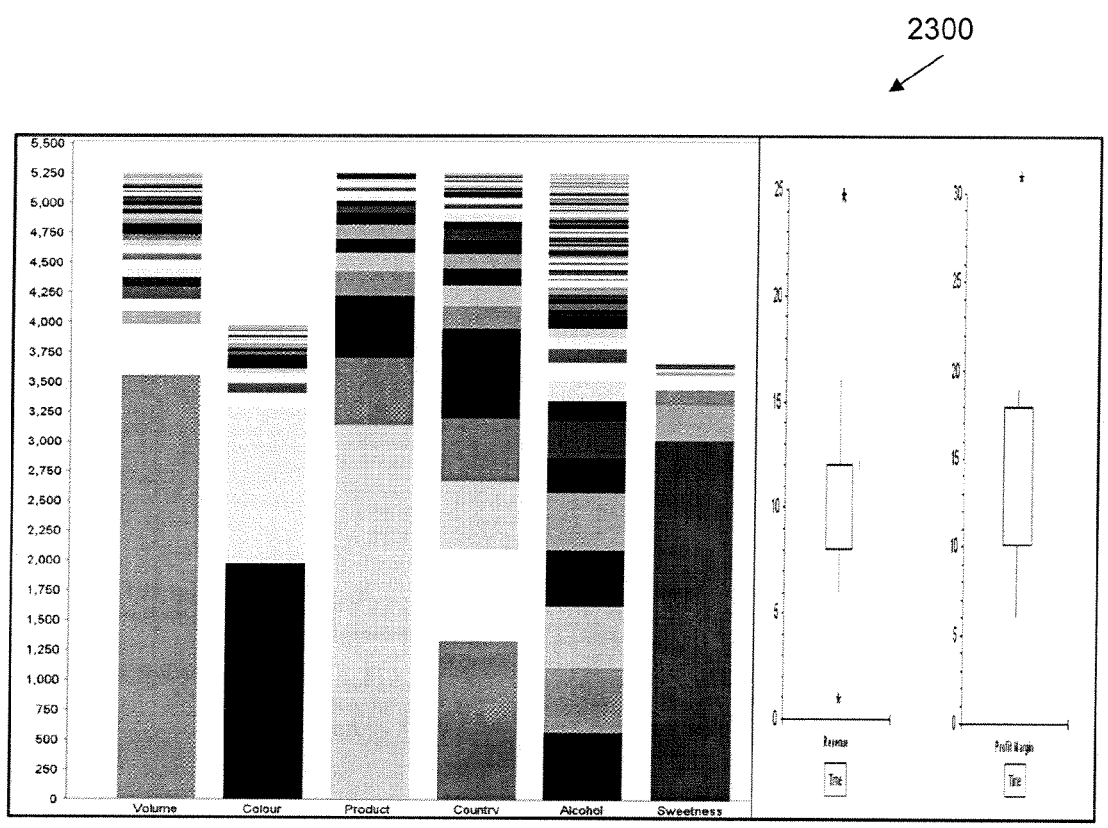
FIG. 23 illustrates an exemplary overall graphical representation for the categorical, numerical, and time dimensions, formed in accordance with an embodiment of the invention.

As shown in FIG. 2, the next processing operation is to display the graphical representations for the categorical, numerical measures, and time dimensions 206. The display module 122 may use the information generated by the categorical dimension module 116, numerical measure module 118, and time module 120 to display the charts and plots associated with categorical, numerical measures, and time dimensions. To illustrate, FIG. 23 shows an overall graphical representation 2300 characterizing the categorical, numerical measure, and time dimensions. It should be recognized by those skilled in the art that not all dimensions must be displayed depending on user and database specifications. The last processing operation shown in FIG. 2 is to allow the user to graphically navigate through the categorical, numerical measure, and time dimensions 208. The categorical dimension module 114, numerical measure module 118, and time module 120 may work in conjunction with one another to allow the user to graphically navigate through the data within an OLAP cube. Ultimately, the user is now provided with a method for fast and informative navigation through the data within a multidimensional database.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

While the present invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt to a particular situation, material, composition of matter, method, process step or steps, to the objective, spirit and scope of the present invention. All such modifications are intended to be within the scope of the claims appended hereto. In particular, while the methods disclosed herein have been described with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

What is claimed is:

1. A non-transitory computer readable media, comprising executable instructions for one or more data processors to:
    analyze a categorical dimension of multi-dimensional data as a function of entropy to form entropy results;
    plot the entropy results as a stacked bar chart; and
    allow a user to graphically navigate through the stacked bar chart to display different views of the stacked bar chart, each view of the different views displaying data structured according to respective recalculated entropy results associated with each view;
    wherein entropy H(x) of a categorical dimension is determined using:

$$H(x) = \sum_{i=1}^{n} p_i \log_2(1/p_i)$$

where pi is the probability of each category, from i-1 to n, occurring the categorical dimension and is calculated as the frequency or distinct count of the value for each category divided by the sum of frequencies for all values in the category.

2. The non-transitory computer readable media of claim 1 further comprising executable instructions to present numerical measure data of the multi-dimensional data as a box plot.

3. The non-transitory computer readable media of claim 2 wherein the executable instructions to present include executable instructions to present numerical measure data as a box plot with statistical indicators.

4. The non-transitory computer readable media of claim 3 wherein the statistical indicators are selected from the median, the upper quartile, the lower quartile, and the inter quartile range for each numerical measure.

5. The non-transitory computer readable media of claim 2 further comprising executable instructions to present outlier values with the box plot.

6. The non-transitory computer readable media of claim 2 further comprising executable instructions to compute skewness and kurtorsis associated with the numerical measure data.

7. The non-transitory computer readable media of claim 1 further comprising executable instructions to display a visualization characterizing a time dimension of the multi-dimensional data.

8. The non-transitory computer readable media of claim 2 further comprising executable instructions to simultaneously display the stacked bar chart and the box plot.

9. The non-transitory computer readable media of claim 8 further comprising executable instructions to display a visualization characterizing a time dimension.

10. The non-transitory computer readable media of claim 9 further comprising executable instructions to allow a user to graphically navigate through the stacked bar chart, the box plot and the visualization.

11. The non-transitory computer readable media of claim 1 wherein the executable instructions to analyze include executable instructions to compute a surprisal value.

12. The non-transitory computer readable media of claim 1 wherein the executable instructions to analyze include executable instructions to compute a probability value.

13. The non-transitory computer readable media of claim 1 wherein the executable instructions to analyze include executable instructions to compute a maximum entropy.

14. The non-transitory computer readable media of claim 13 wherein the executable instructions to analyze include executable instructions to compute entropy as a percent of the maximum entropy.

15. A computer-implemented method for implementation by one or more data processors comprising:
analyzing, by at least one data processor, a categorical dimension of multi-dimensional data as a function of entropy to form entropy results;
plotting, by at least one data processor, the entropy results as a stacked bar chart; and
allowing, by at least one data processor, a user to graphically navigate through the stacked bar chart to display different views of the stacked bar chart, each view of the different views displaying data structured according to respective recalculated entropy results associated with each view;
wherein entropy H(x) of a categorical dimension is determined using:

$$H(x) = \sum_{i=1}^{n} p_i \log_2(1/p_i)$$

where pi is the probability of each category, from i-1 to n, occurring the categorical dimension and is calculated as the frequency or distinct count of the value for each category divided by the sum of frequencies for all values in the category.

16. A computer system comprising:
a central processing unit;
memory coupled to the central processing unit storing executable programs to cause the central processing unit to perform operations comprising:
analyzing a categorical dimension of multi-dimensional data as a function of entropy to form entropy results;
plotting the entropy results as a stacked bar chart; and
allowing a user to graphically navigate through the stacked bar chart to display different views of the stacked bar chart, each view of the different views displaying data structured according to respective recalculated entropy results associated with each view,
wherein entropy H(x) of a categorical dimension is determined using:

$$H(x) = \sum_{i=1}^{n} p_i \log_2(1/p_i)$$

where pi is the probability of each category, from i-1 to n, occurring the categorical dimension and is calculated as the frequency or distinct count of the value for each category divided by the sum of frequencies for all values in the category.

17. The non-transitory computer readable media of claim 1, wherein the multi-dimensional data is characterized by an online analytical processing cube.

18. The non-transitory computer readable media of claim 1, wherein bars in each view of the stacked bar chart are charted in an order based on their respective entropy percent.

19. The method of claim 15, wherein bars in each view of the stacked bar chart are charted in an order based on their respective entropy percent.

20. The system of claim 16, wherein bars in each view of the stacked bar chart are charted in an order based on their respective entropy percent.

* * * * *